(12) United States Patent
Tsai et al.

(10) Patent No.: US 11,006,471 B2
(45) Date of Patent: May 11, 2021

(54) WIRELESS COMMUNICATION MODULE SUPPORTING SHORT-RANGE AND LONG-RANGE WIRELESS COMMUNICATIONS

(71) Applicant: Hewlett-Packard Development Company, L.P., Spring, TX (US)

(72) Inventors: Ming-Shien Tsai, Taipei (TW); Chung-Chun Chen, Taipei (TW); Yi-Kang Hsieh, Taipei (TW); Isaac Lagnado, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/603,846

(22) PCT Filed: Apr. 24, 2017

(86) PCT No.: PCT/US2017/029030
§ 371 (c)(1),
(2) Date: Oct. 9, 2019

(87) PCT Pub. No.: WO2018/199875
PCT Pub. Date: Nov. 1, 2018

(65) Prior Publication Data
US 2020/0120734 A1 Apr. 16, 2020

(51) Int. Cl.
*H04W 76/15* (2018.01)
*H04W 4/80* (2018.01)
(Continued)

(52) U.S. Cl.
CPC ............. *H04W 76/15* (2018.02); *H04W 4/80* (2018.02); *H04W 8/005* (2013.01);
(Continued)

(58) Field of Classification Search
CPC ....... H04W 4/80; H04W 76/14; H04W 8/005; H04W 4/21; H04W 76/15; H04W 52/283;
(Continued)

(56) References Cited

U.S. PATENT DOCUMENTS 8,626,144 B2 * 1/2014 Talty ................ H04W 4/80
455/418
8,838,135 B2 9/2014 Moshfeghi
(Continued)

FOREIGN PATENT DOCUMENTS

CN 105940664 6/2016
WO WO-1994019877 A1 9/1994
(Continued)

OTHER PUBLICATIONS

Saishankar, N., et al., WiGig and IEEE 802.11ad for Multi-Gigabyte-Per-Second WPAN and WLAN, Nov. 30, 2012.

Primary Examiner — Md K Talukder
(74) Attorney, Agent, or Firm — HPI Patent Department

(57) ABSTRACT

In one example, a communication device is described, which includes at least one antenna and a wireless communication module communicatively coupled to the at least one antenna. The wireless communication module may include a processing unit to search another device within a signal range via the at least one antenna and establish a short-range wireless communication with the other device via a first radio frequency (RF) channel associated with a frequency band. Further, the processing unit may establish a long-range wireless communication with the other device via at least one second RF channel associated with the frequency band to transmit and receive data to and from the other device.

20 Claims, 7 Drawing Sheets

(51) Int. Cl.
  *H04W 8/00* (2009.01)
  *H04W 52/28* (2009.01)
  *H04W 52/36* (2009.01)
  *H04W 52/50* (2009.01)
  *H04W 72/04* (2009.01)
  *H04W 88/06* (2009.01)

(52) U.S. Cl.
  CPC ....... *H04W 52/283* (2013.01); *H04W 52/367* (2013.01); *H04W 52/50* (2013.01); *H04W 72/0453* (2013.01); *H04W 88/06* (2013.01)

(58) Field of Classification Search
  CPC ............... H04W 52/367; H04W 52/50; H04W 72/0453; H04W 88/06
  See application file for complete search history.

(56) References Cited

U.S. PATENT DOCUMENTS

| | | |
|---|---|---|
| 9,094,950 B2 | 7/2015 | Sip |
| 2007/0032225 A1* | 2/2007 | Konicek ............ G07C 9/00182 455/417 |
| 2007/0201393 A1* | 8/2007 | Srikrishna ........... H04W 52/286 370/318 |
| 2009/0003251 A1* | 1/2009 | Imae ..................... H04W 40/12 370/310 |
| 2009/0034498 A1* | 2/2009 | Banerjea .............. H04W 76/15 370/338 |
| 2010/0210319 A1* | 8/2010 | Tanaka ................... B60R 25/24 455/572 |
| 2011/0156640 A1 | 6/2011 | Moshfeghi |
| 2011/0183614 A1* | 7/2011 | Tamura .................. H04W 4/21 455/41.2 |
| 2012/0196546 A1* | 8/2012 | Ly-Gagnon ............... H03F 3/24 455/73 |
| 2013/0012221 A1* | 1/2013 | Zou ....................... H04W 72/10 455/452.1 |
| 2013/0066966 A1* | 3/2013 | Patil ...................... H04W 8/005 709/204 |
| 2013/0165231 A1* | 6/2013 | Nelson ................ G07F 17/3218 463/42 |
| 2013/0176876 A1* | 7/2013 | Wakayama ......... H04W 72/048 370/252 |
| 2014/0295758 A1* | 10/2014 | Pedersen ............... G06F 1/1632 455/41.2 |
| 2015/0031394 A1* | 1/2015 | Yang ....................... H04W 4/90 455/456.2 |
| 2015/0095533 A1 | 4/2015 | Valavi et al. |
| 2015/0116103 A1* | 4/2015 | Yang .................... G08B 21/24 340/438 |
| 2015/0222699 A1* | 8/2015 | Quinn ................. H04L 67/1091 709/203 |
| 2015/0334138 A1* | 11/2015 | Conklin ................. G06F 3/1423 715/753 |
| 2016/0056669 A1* | 2/2016 | Bell .......................... G06F 1/26 700/286 |
| 2016/0100303 A1* | 4/2016 | Kim ...................... H04W 4/023 455/426.1 |
| 2016/0173172 A1* | 6/2016 | Greene .................... H04B 1/18 455/562.1 |
| 2016/0336984 A1* | 11/2016 | Demay ................... H04W 4/80 |
| 2017/0064752 A1* | 3/2017 | Veikkolainen ........ H04W 8/005 |
| 2017/0064753 A1* | 3/2017 | Zhao ...................... H04W 4/80 |
| 2017/0086044 A1* | 3/2017 | Spina ...................... H04W 4/21 |
| 2017/0164172 A1* | 6/2017 | Kodama ............. H04M 1/7253 |
| 2017/0181047 A1* | 6/2017 | Cai ....................... H04W 36/08 |
| 2017/0207859 A1* | 7/2017 | Kim ...................... H04W 76/14 |
| 2017/0223579 A1* | 8/2017 | Lee ...................... H04W 48/14 |
| 2018/0115747 A1* | 4/2018 | Bayley ............. H04W 52/0241 |
| 2018/0131201 A1* | 5/2018 | Calhoun .................. H04W 4/38 |
| 2018/0352473 A1* | 12/2018 | Gunasekara ........ H04W 48/16 |
| 2018/0367959 A1* | 12/2018 | Heikkinen ............ H04W 76/40 |

FOREIGN PATENT DOCUMENTS

| | | |
|---|---|---|
| WO | WO-2006033443 A1 | 3/2006 |
| WO | WO-2016208899 A1 | 12/2016 |

* cited by examiner

WIRELESS COMMUNICATION MODULE SUPPORTING SHORT-RANGE AND LONG-RANGE WIRELESS COMMUNICATIONS

BACKGROUND

Wireless communication devices, such as tablets and laptops, may have antennas for transmitting and receiving signals. A wireless communication device may transmit/ receive a radio frequency (RF) signal to/from other devices via the antennas. A wireless communication device may couple with other devices, such as docking stations and peripheral devices, to communicate data. For example, a laptop computer may establish a connection with an external display or virtual reality (VR) glass to exchange data. In another example, a laptop computer may couple with a docking station in order to communicate data between the laptop computer and another device or to connect with multiple devices such as input/output (I/O) devices, external displays, and the like.

BRIEF DESCRIPTION OF THE DRAWINGS

Examples are described in the following detailed description and in reference to the drawings, in which.

DETAILED DESCRIPTION

Figure 1:
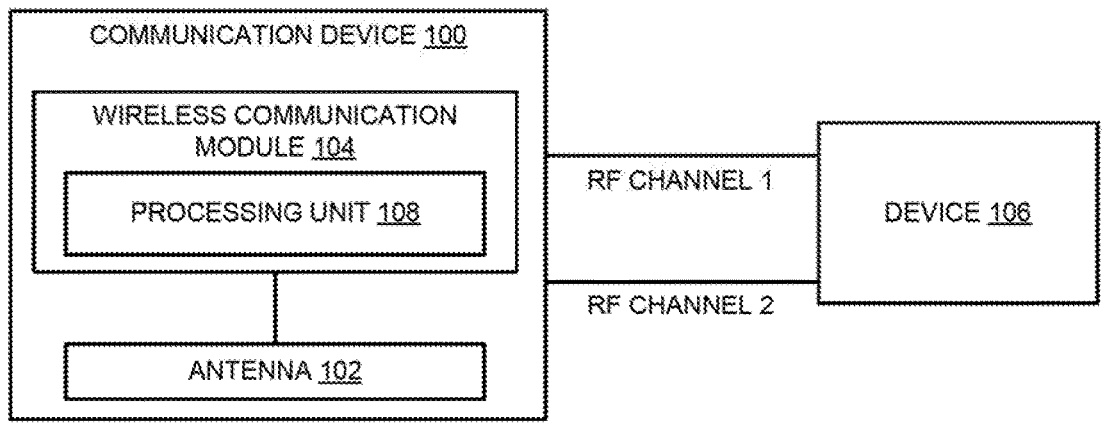
FIG. 1 is a block diagram of an example communication device including a wireless communication module that utilizes a frequency band to establish short-range and long-range wireless communications.

Wireless communication devices may use antennas to transmit and/or receive RF signals. Example antenna may be "a multi-band antenna" and/or "multiple antennas" that support multiple frequency bands. Each frequency band may include a frequency or a range of frequencies that correspond to a set of RF channels. Example frequency band may include a 60 GHz frequency band. Wireless gigabit alliance (WiGig) and wireless connector utilize 60 GHz frequency band to be their wireless technology. For example, the wireless connector may be for proximity communication that allows up to 7 Gbps data transmission between a transmitter and a receiver within 10 millimeters' range, while the WiGig/wireless high-definition multimedia interface (WHDMI) may be for long distance communication that allows up to 7 Gbps data transmission between the transmitter and the receiver in a range of 2-10 meters.

WiGig is a wireless transmission technique of data transmission performed on the 60 GHz frequency band in multi-gigabit per second. For example, when a WiGig wireless docking is applied to connection between a communication device and a peripheral apparatus, the WiGig wireless docking can break through a limit of a transmission speed of the wireless fidelity (Wi-Fi), and provides an actual transmission speed that is 10 times faster than that of the Wi-Fi to reach a speed of multi-gigabit per second. Further, the wireless connector may utilize the 60 GHz frequency band to enable the communication device to search, detect, and pair with the peripheral apparatus. In one example, the wireless connector may enable short-range wireless communication and the WiGig may enable long-range wireless communication. In another example, the WiGig may enable transmission of data from the communication device to the peripheral apparatus, while pairing enables to transmit control signals from the peripheral apparatus to the communication device to control the data that is being transmitted.

Each of the WiGig and the wireless connector may be associated with a separate wireless communication module (e.g., a WiGig module and a wireless connector module) to perform WiGig and wireless connector functionalities, respectively. Each wireless communication module may be associated with a corresponding antenna, intermediate frequency (IF), and hardware to implement the associated functionalities, and hence may increase bill of materials cost and/or increase space for antenna design.

Examples described herein may provide a communication device having a wireless communication module to establish a short-range wireless communication (e.g., the wireless connector functionality) with another device via a first RF channel associated with a frequency band, and establish a long-range wireless communication (e.g., the WiGig functionality) with the other device via at least one second RF channel associated with the frequency band to transmit and receive data to and from the other device. The wireless communication module may utilize a first transmission power level (e.g., 0-2 decibel-milliwatts (dBm)) to establish the short-range wireless communication via the first RF channel associated with the 60 GHz frequency band and utilize a second transmission power level (e.g., 21-24 dBm) to establish the long-range wireless communication via the at least one second RF channel associated with the 60 GHz frequency band.

Examples described herein may use one wireless communication module (e.g., that utilizes 60 GHz frequency band) to implement the WiGig and wireless connector functionalities on the communication device, thereby saving space for antenna/hardware design and/or bill of materials cost associated with the antenna/hardware design.

Turning now to figures, FIG. 1 is a block diagram of an example communication device 100 including a wireless communication module 104 that utilizes a frequency band to establish short-range and long-range wireless communications. Example communication device 100 may include a mobile phone, a tablet, a laptop, a desktop computer, a personal computer (PC), a personal digital assistant (PDA), and the like.

Communication device 100 may include at least one antenna 102 and wireless communication module 104 communicatively coupled to at least one antenna 102. Antenna 102 may be designed to cover the frequency band at 60 GHz (i.e., 57 GHz-64 GHz). Wireless communication module 104 may utilize the 60 GHz frequency band to establish the short-range wireless communication and the long-range wireless communication using different protocols at different transmission power levels.

In one example, wireless communication module 104 may support the short-range wireless communication using a first protocol. In this case, wireless communication module 104 may use a low-power radio (or the first protocol) to establish the short-range wireless communication. Low-power radio may draw less power from the connected system and may help maintaining a longer battery life. Examples of the low-power radio may include a wireless connector that supports 60 GHz frequency band.

In another example, wireless communication module 104 may support the long-range wireless communication using a second protocol. In this case, wireless communication module 104 may use a high-power radio (or the second protocol) to establish the long-range wireless communication. High-power radio may draw high power. Examples of the high-power radio may include a WiGig that supports 60 GHz frequency band. Wireless communication module 104 may also be called a device, a component, a unit, and the like. The first protocol may have a shorter range than the range of the second protocol.

Further, wireless communication module 104 may include a processing unit 108. Processing unit 108 may include, for example, hardware devices including electronic circuitry for implementing the functionality described herein. In addition or as an alternative, processing unit 108 may be implemented as a series of instructions encoded on a machine-readable storage medium of communication device 100 and executable by processor. In examples described herein, the processor may include, for example, one processor or multiple processors included in a single device or distributed across multiple devices. It should be noted that, in some embodiments, some modules are implemented as hardware devices, while other modules are implemented as executable instructions.

During operation, processing unit 108 may use wireless communication module 104 to search another device 106 within a signal range via at least one antenna 102 and establish a short-range wireless communication with device 106 via a first RF channel associated with the frequency band (i.e., 60 GHz frequency band). In one example, the first RF channel may enable pairing of communication device 100 with device 106 via the short-range wireless communication. Further, processing unit 108 may establish a long-range wireless communication with device 106 via at least one second RF channel associated with the frequency band to transmit and receive data to and from device 106. For example, device 106 may be a peripheral device or a docking station. Example peripheral device may include an external display, a VR glass, and the like.

For example, processing unit 100 may trigger wireless communication module 104 to establish the long-range wireless communication based on a distance between communication device 100 and device 106. When the distance between communication device 100 and device 106 exceeds a threshold value, processing unit 108 may utilize a transmission power level to switch the connection from the short-range wireless communication to the long-range wireless communication to transmit data via the at least one second RF channel associated with the frequency band. For example, processing unit 108 may manually switch the connection between communication device 100 and device 108 upon a user input or automatically switch the connection between communication device 100 and device 106.

Wireless communication module 104 ray use a wireless connector technique associated with the frequency band for the short-range wireless communication and use a WiGig technique associated with the frequency band for the long-range wireless communication. The short-range wireless communication and the long-range wireless communication may utilize different communication protocols. In one example, wireless communication module 104 may enable communication device 100 to establish the short-range wireless communication and the long-range wireless communication with a same device or different devices.

Further, processing unit 108 may enable wireless communication module 104 to utilize a first transmission power level for establishing the short-range wireless communication via the first RF channel. Processing unit 108 may enable wireless communication module 104 to utilize a second transmission power level for establishing the long-range wireless communication via the at least one second RF channel using a look-up table. The first transmission power level may be less than the second transmission power level.

Example look-up table may include a first transmission power range and a second transmission power range corresponding to the short-range wireless communication and the long-range wireless communication, respectively. In one example, the first transmission power range is between 0-2 dBm and the second transmission power range is between 21-24 dBm. The look-up table can be stored in a RF front-end module (FEM) of a modem/transceiver as shown in FIG. 2.

Figure 2:
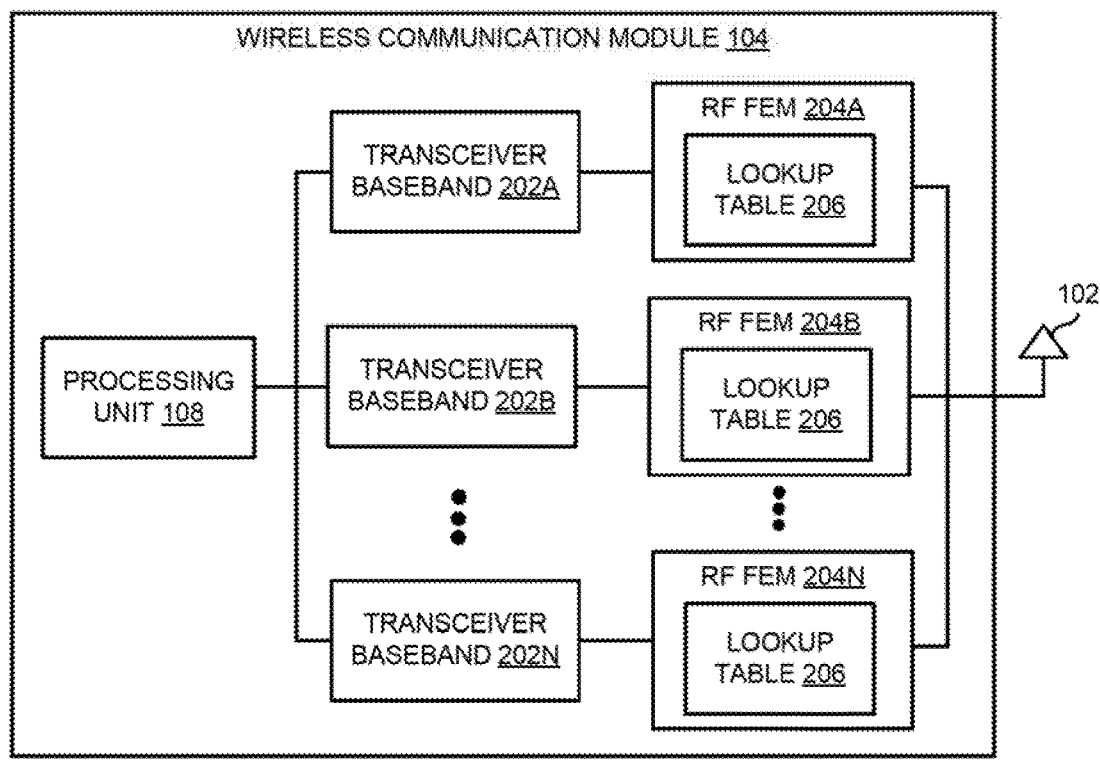
FIG. 2 is a block diagram of the example wireless communication module of FIG. 1, including a look-up table.

FIG. 2 is a block diagram of example wireless communication module 104 of FIG. 1, including look-up table 206. As shown in FIG. 2, wireless communication module 104 may include transceiver basebands 202A-N and RF FEMs 204A-N. RF FEMs 204A-N may include switch(s) to operate antenna 102 in transmit mode or receive mode based on the transmission power signal. In some examples, each RF FEM 204A-N may also include components such as filters, low-noise amplifiers, and/or down-conversion mixers needed to process the signal at the original incoming radio frequency, before the signal is converted to a lower IF. Transceiver basebands 202A-N may include logic, circuitry, and/or code that may be enabled to process baseband signals during transmission or reception.

Processing unit 108 may control each of RF FEMs 204A-N to operate in a low-power mode or a high-power mode to transmit/receive a plurality of RF signals through the corresponding RF channels. For example, in receiving mode, each RF FEM 204A-N may provide the functionality of selecting a frequency range and reducing any signal within that range to an IF output corresponding to one of transceiver basebands 202A-N.

Further as shown in FIG. 2, RF FEMs 204A-N may include a look-up table 206, through which processing unit 108 may determine a transmission power level that supports the WiGig transmission (i.e., long-range wireless communication) or wireless connector transmission (i.e., short-range wireless communication). For example, wireless communication module 104 may utilize a first transmission power level (e.g., low-power mode) for establishing the short-range wireless communication via the first RF channel and utilize a second transmission power level (e.g., high-power mode) for establishing the long-range wireless communication via the second RF channel using look-up table 206.

Figure 3:
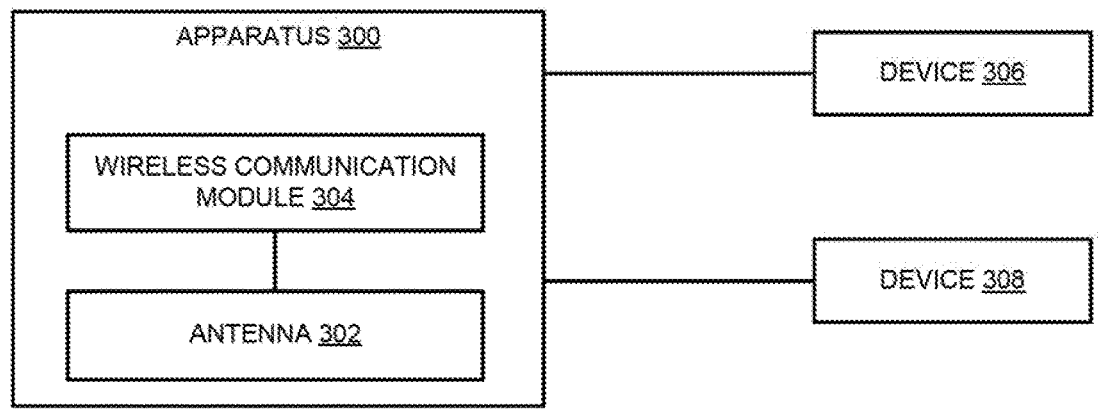
FIG. 3 is a block diagram of an example apparatus including a wireless communication module to establish short-range and long-range wireless communications based on different transmission power levels.

FIG. 3 is a block diagram of an example apparatus 300 including a wireless communication module 304 to establish shod-range and long-range wireless communications based on different transmission power levels. Example apparatus 300 may include an electronic device such as a mobile phone, a tablet, a laptop, a desktop computer, a personal computer (PC), and the like. In another example, apparatus 300 may include a docking station.

Apparatus 300 may include at least one antenna 302 and wireless communication module 304 communicatively coupled to at least one antenna 302. Wireless communication module 304, for example, may support a communication protocol such as a wireless connector using 60 GHz frequency band, which can provide a shorter signal coverage range and enable apparatus 300 to search a set of devices 306 and 308 within a smaller range and establish wireless connections therewith. Further, wireless communication module 304, for example, may also support another communication protocol of WiGig using 60 GHz frequency band, which can provide a wider signal coverage and a faster data transmission speed, so as to enable apparatus 300 to establish a high-speed wireless connection with devices 306 and 308.

During operation, wireless communication module 304 may utilize a first transmission power level to enable paring of devices 306 and 308 via the short-range wireless communication using a first RF channel associated with the frequency band.

Further, wireless communication module 304 may utilize a second transmission power level to establish the long-range wireless communication with set of devices 306 and 308 via a set of second RF channels associated with the frequency band to transmit and receive data to and from the set of devices 306 and 308.

For example, consider that devices 306 and 308 are an electronic device and a peripheral device, respectively. Further, consider that apparatus 300 is a docking station. In this case, docking station 300 may communicate the data between electronic device 306 and peripheral device 308 via the set of second RF channels, while docking station 300 may be paired with electronic device 306 and peripheral device 308 via the first RF channel.

In another example, consider apparatus 300 is an electronic device, and the wireless communication module may communicate the data between electronic device 300 and set of devices 306 and 308 via the set of second RF channels, while the electronic device 300 may be paired with at least one of set of devices 306 and 308 via the first RF channel. The wireless communication module may connect apparatus 300 to each of the set of devices 306 and 308 via one second RF channel or multiple second RF channels as explained in FIGS. 4A-4C and FIG. 5.

Figure 4A:
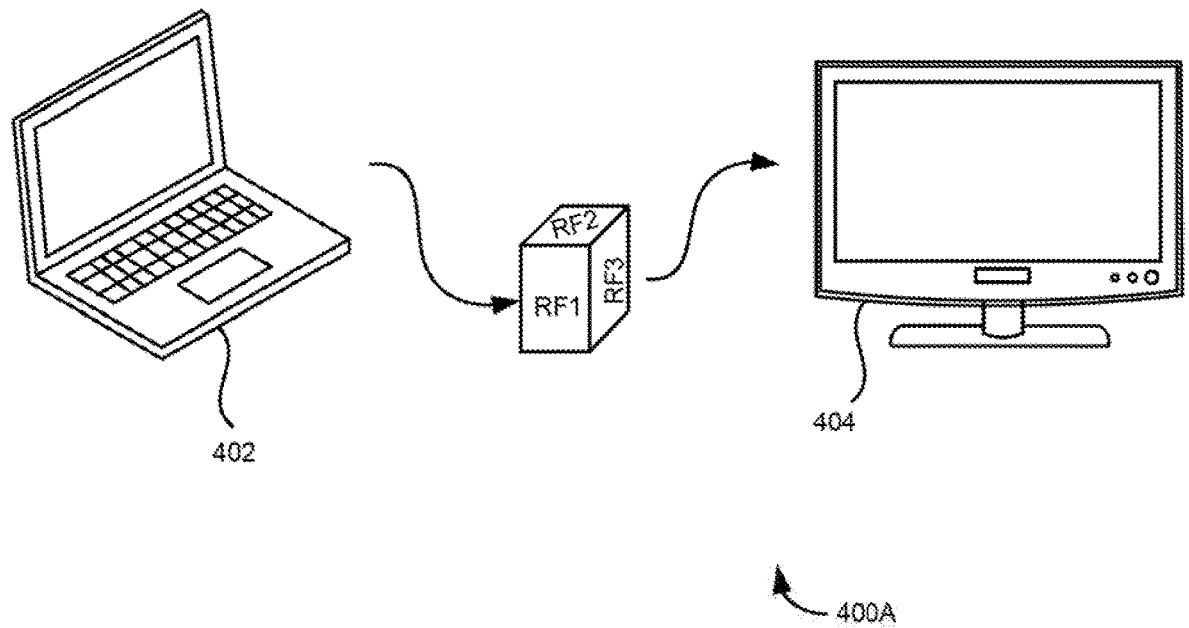
FIGS. 4A-4C illustrate example schematics depicting establishing short-range and long-range wireless communications between a laptop and an external display using different channels associated with a same frequency band.
Figure 4B:
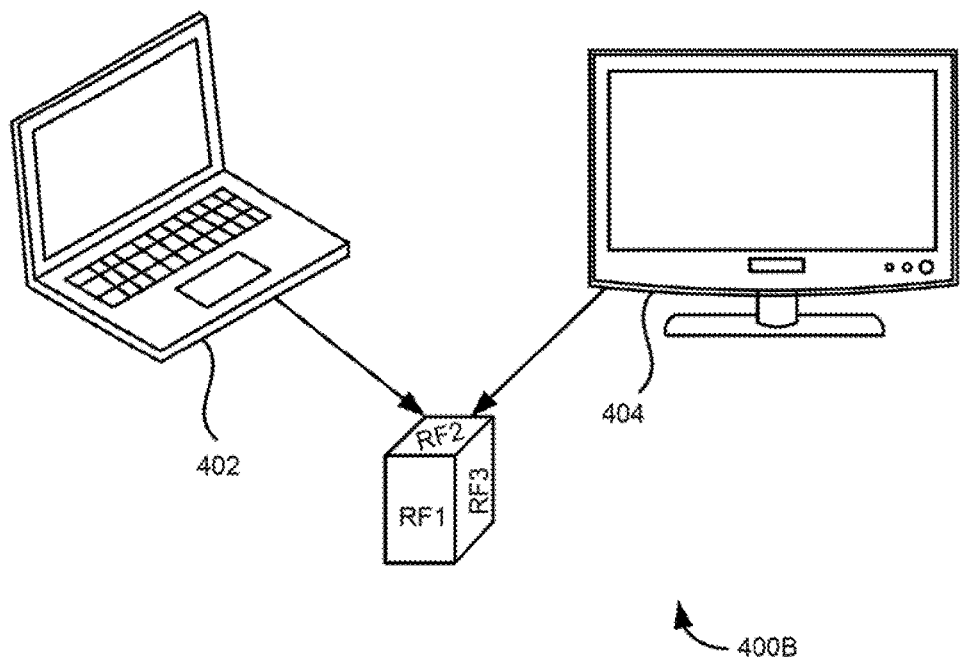
Figure 4C:
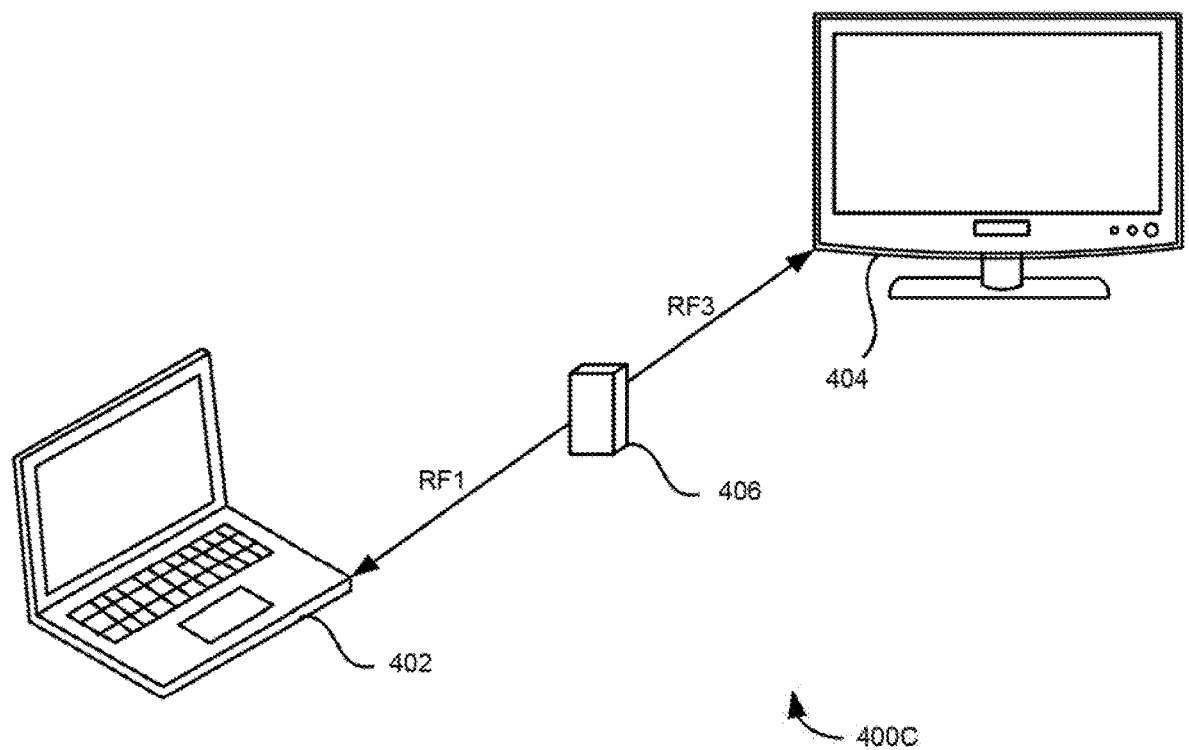

FIGS. 4A-4C illustrate example schematics depicting establishing short-range and long-range wireless communications between a laptop 402 and an external display 404 using different channels associated with same frequency band. FIG. 4A illustrates an example schematic 400A depicting laptop 402, external display 404, and RF channels RF1, RF2, and RF3 to establish connection between laptop 402 and external display 404. RF2 may support pairing via a wireless connector that utilizes 60 GHz frequency band. RF1 and RF3 can work simultaneously to offer WiGig communication via 60 GHz frequency band from laptop 402 and external display 404.

As shown in schematic 400B of FIG. 4B, both laptop 402 and external display 404 may touch RF2 to get paired and then goes to a selection bar (i.e., displayed on a user interface (UI)) to enable extending communication distance between laptop 402 and external display 404. As shown in schematic 400C of FIG. 4C, docking station 406 may assign RF1 to laptop 402 and RF3 to external display 404. In this example, docking station 406 may extend data communication between laptop 402 and external display 404 to a wider range. For example, since both RF1 and RF3 supports communication range up to 10 meters, docking station 406 may extend data communication range up to 20 meters by assigning RF1 to laptop 402 and RF3 to external display 404.

Figure 5:
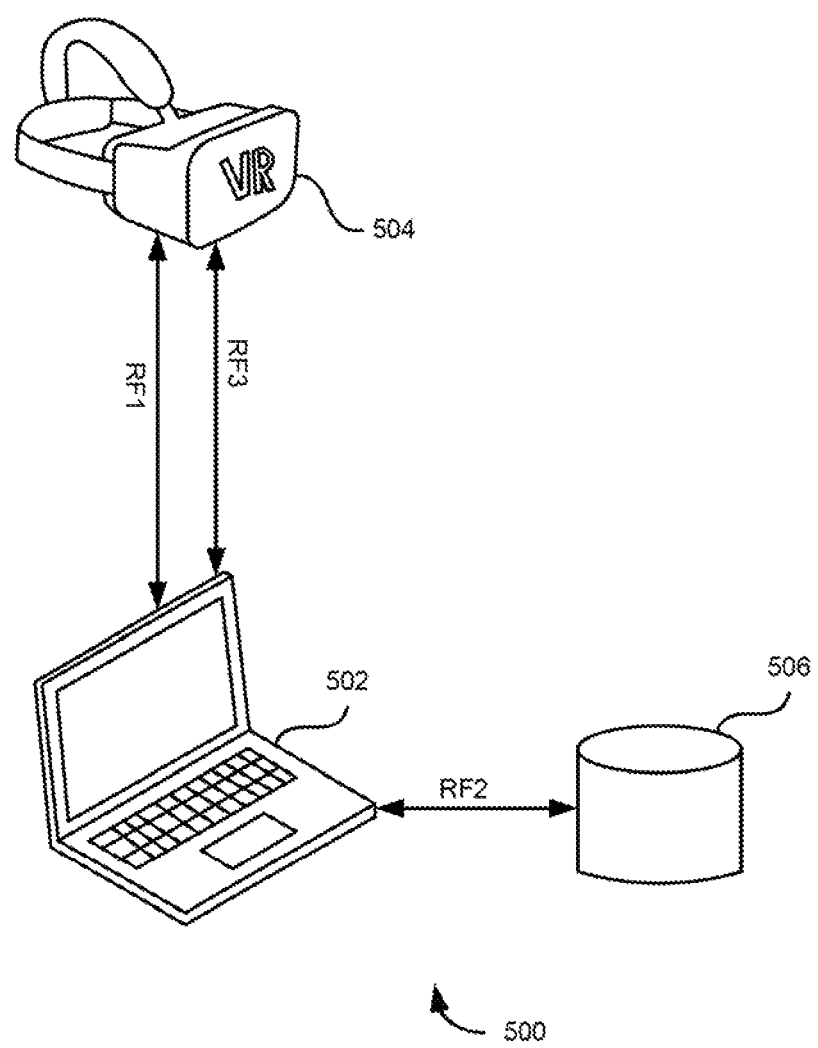
FIG. 5 illustrates an example schematic depicting establishing a long-range wireless communication with increased bandwidth between a laptop and a VR glass using different RF channels associated with same frequency band.

FIG. 5 illustrates an example schematic 500 depicting establishing a WiGig communication with increased bandwidth between a laptop 502 and a virtual reality (VR) glass 504 using different RF channels associated with same frequency band. In this example, wireless communication module in laptop 502 may assign RF2 to data store 506 (i.e., wireless connector device) to support pairing between laptop 502 and data store 506 via wireless connector that utilizes 60 GHz frequency band.

Laptop 502 may scan and determine a WiGig device (e.g., VR glass) that needs a high capacity communication with laptop 502. Further, wireless communication module in laptop 502 may assign RF1 and RF3 to VR glass 504 to support WiGig communication with increased bandwidth between laptop 502 and VR glass 504. In this case, laptop 502 and VR glass 504 may exchange data with increased bandwidth via RF1 and RF3. In one example, the wireless connector communication and WiGig communication can be established simultaneously. For example, each of RF1 and RF3 may support 5 Gbps data transmission. Therefore, assigning both RF1 and RF3 to VR glass 504 may increase communication capacity up to 10 Gbps.

Figure 6:
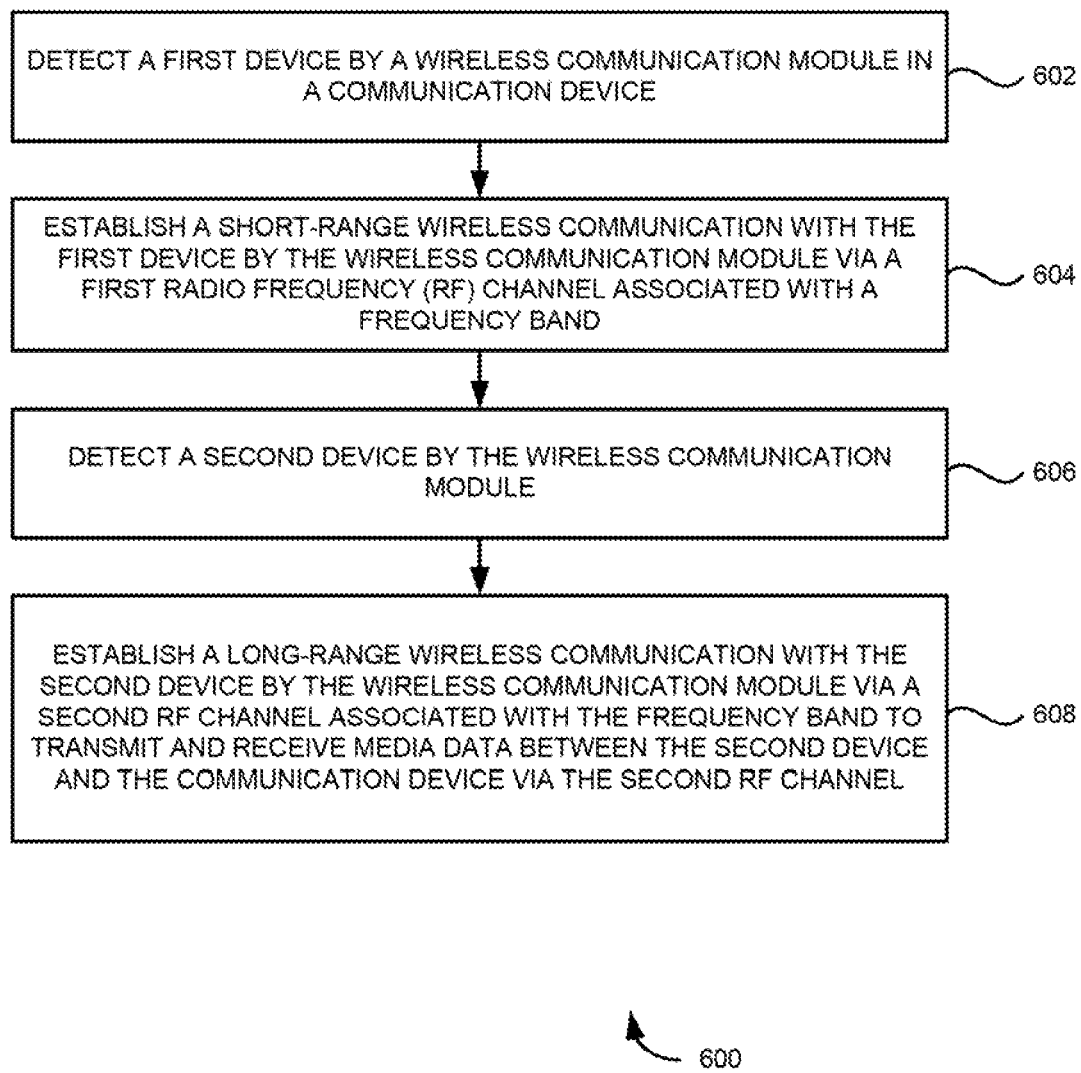
FIG. 6 depicts an example flow chart for establishing short-range and long-range wireless communications with different devices using different channels associated with a same frequency band.

FIG. 6 depicts an example flow chart 600 for establishing a short-range and a long-range wireless communication with different devices using different channels associated with a same frequency band. It should be understood that the process depicted in FIG. 6 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate software, or use a combination of hardware and software to perform the illustrated processes.

At 602, a first device may be detected by a wireless communication module in a communication device. At 604, a short-range wireless communication may be established with the first device by the wireless communication module via a first RF channel associated with a frequency band. In one example, the frequency band is a 60 GHz frequency band. Further, the short-range wireless communication may be a wireless connection that uses the 60 GHz frequency band for pairing the first device to the communication device. Further, the communication device may utilize a first transmission power level for establishing the short-range wireless communication via the first RF channel using a look-up table. In one example, the first transmission power level may be in a range of 0-2 dBm.

At 606, a second device may be detected by the wireless communication module. At 608, a long-range wireless communication may be established with the second device by the wireless communication module via a second RF channel associated with the frequency band to transmit and receive data between the second device and the communication device via the second RF channel. The short-range wireless communication and long-range wireless communication may be established simultaneously.

In one example, the long-range wireless communication may be a WiGig connection that uses the 60 GHz frequency band to transmit or receive data between the second device and the communication device. The communication device may utilize a second transmission power level for establishing the long-range wireless communication via the second RF channel using the look-up table. The first transmission power level may be less than the second transmission pow level. The second transmission power level may be in a range of 21-24 dBm.

Figure 7A:
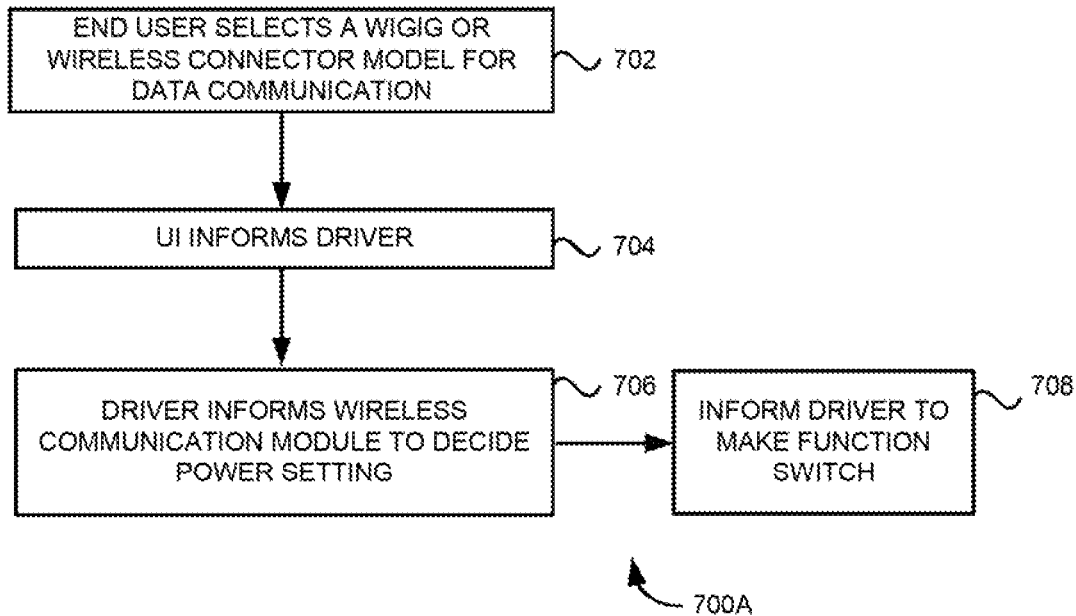
FIG. 7A depicts an example flow chart illustrating a manual switching mechanism to switch between the short-range and the long-range wireless communication using a transmission power level.

FIG. 7A depicts an example flow chart 700A illustrating a manual switching mechanism to switch between the short-range and the long-range wireless communication using a transmission power level. At 702, a WiGig or wireless connector model may be selected by a user for data communication. In one example, the WiGig or wireless connector model may be selected on a UI of a communication device. At 704, the UI may inform a driver of the communication device regarding the selection. At 706, the driver may inform a wireless communication module to decide power setting (i.e., transmission power level) using a look-up table embedded in a RF FEM of the wireless communication module. At 708, upon setting the transmission power level, wireless communication module may inform the driver to switch the communication corresponding to the selected WiGig or wireless connector model.

Figure 7B:
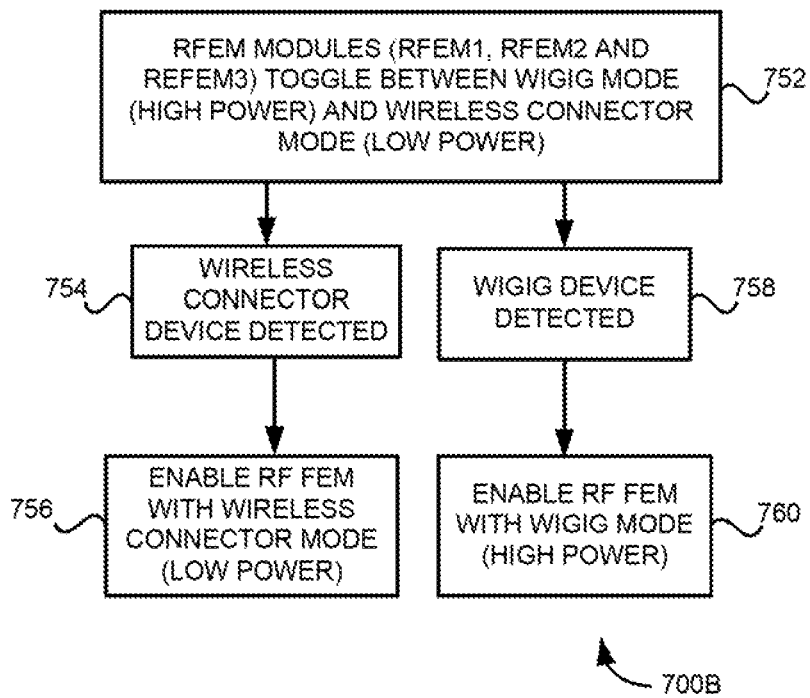
FIG. 7B depicts an example flow chart illustrating an automatic switching mechanism to switch between the short-range and the long-range wireless communication using the transmission power level.

FIG. 7B depicts an example flow chart 700B illustrating an automatic switching mechanism to switch between the short-range and the long-range wireless communication using the transmission power level. RF FEMs (e.g., RF FEMs 1-3) may toggle between WiGig mode (i.e., high power) and wireless connector mode (i.e., low power) as shown in 752. For example, receiver RF FEMs may provide the functionality of selecting a frequency range and reducing any signal within that range to an IF output. Further, receiver RF FEMs may enable selection of RF channels to support either the WiGig mode or wireless connector mode based on the transmission power level.

The communication device may scan and determine a wireless connector device or a WiGig device that needs to be connected. In one example, when a wireless connector device is detected (e.g., at 754), then RF FEM may be enabled with the wireless connector mode at 756. Iin another example, when a WiGig device is detected at 758, then RF FEM may be enabled with the WiGig mode at 760.

Figure 8:
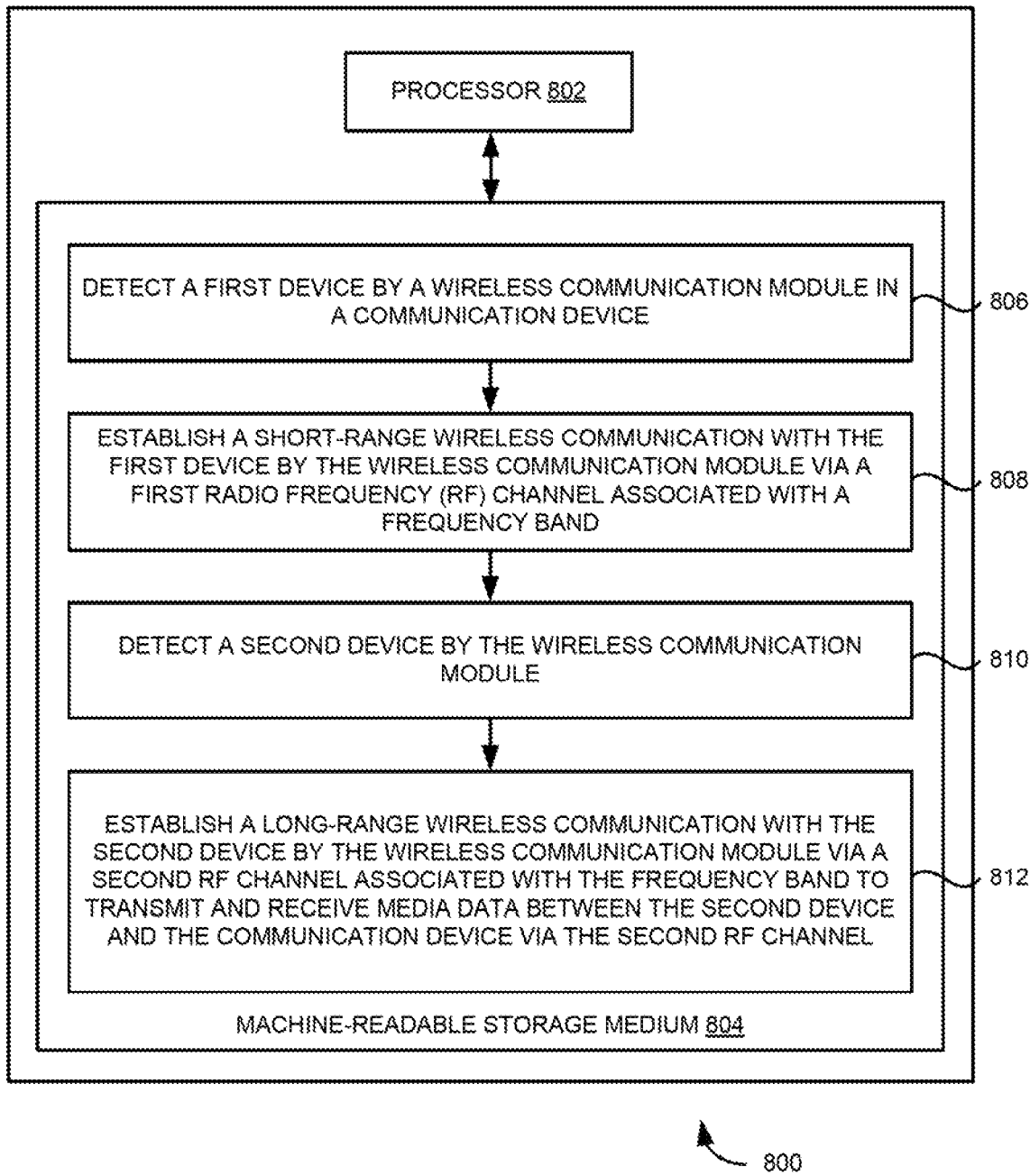
FIG. 8 depicts an example block diagram showing a non-transitory computer-readable medium to establish short-range and long-range wireless communications using a wireless communication module that utilizes 60 GHz frequency band.

FIG. 8 depicts an example block diagram of a computing device 800 showing a non-transitory computer-readable medium 804 to establish short-range and long-range wireless communications using a wireless communication module that utilizes 60 GHz frequency band. Computing device 800 (e.g., communication device 100 as shown in FIG. 1) may include a processor 802 and a machine-readable storage medium 804 communicatively coupled through a system bus. Processor 802 may be any type of central processing unit (CPU), microprocessor, or processing logic that interprets and executes machine-readable instructions stored in machine-readable storage medium 804. Machine-readable storage medium 804 may be a random-access memory (RAM) or another type of dynamic storage device that may store information and machine-readable instructions that may be executed by processor 802. For example, machine-readable storage medium 804 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 804 may be a non-transitory machine-readable medium. In an example, machine-readable storage medium 804 may be remote but accessible to computing device 800.

Machine-readable storage medium 804 may store instructions 806-812. In an example, instructions 806-812 may be executed by processor 802 to establish short-range and long-range wireless communication with different devices or a same device using different channels associated with a same frequency band. Instructions 806 may be executed by processor 802 to detect a first device by the wireless communication module in communication device 800. Instructions 808 may be executed by processor 802 to establish a short-range wireless communication with the first device by the wireless communication module via a first RF channel associated with a frequency band (e.g., 60 GHz).

Instructions 810 may be executed by processor 802 to detect a second device by the wireless communication module. Instructions 812 may be executed by processor 802 to establish a long-range wireless communication with the second device by the wireless communication module via a second RF channel associated with the same frequency band to transmit and receive data between the second device and the communication device via the second RF channel. The second device can be same as the first device or a different device.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A communication device, comprising:
a storage medium to store look-up information that correlates transmission power ranges to respective different range wireless communications, the different range wireless communications comprising a short-range wireless communication and a long-range wireless communication;
an antenna; and
a wireless communication module communicatively coupled to the antenna, wherein the wireless communication module comprises a processing unit to:
detect a first device within a signal range via the antenna, and establish the short-range wireless communication with the first device via a first radio frequency (RF) channel associated with a frequency band;
determine, based on accessing the look-up information stored in the storage medium, a transmission power level for the long-range wireless communication; and
establish, utilizing the determined transmission power level, the long-range wireless communication with the first device via a second RF channel associated with the frequency band to transmit and receive data to and from the first device.

2. The communication device of claim 1, wherein the wireless communication module is to use a wireless connector technique associated with the frequency band for the short-range wireless communication and to use a wireless gigabit alliance (WiGig) technique associated with the frequency band for the long-range wireless communication, and wherein the frequency band is a 60 GHz frequency band.

3. The communication device of claim 1, wherein the short-range wireless communication and the long-range wireless communication utilize different communication protocols, and wherein the communication device is to pair with the first device via the short-range wireless communication.

4. The communication device of claim 1, wherein the processing unit is to:
determine, based on accessing the look-up information stored in the storage medium, a further transmission power level for the short-range wireless communication; and
establish, utilizing the further transmission power level, the short-range wireless communication with the first device,
wherein the further transmission power level is less than the determined transmission power level.

5. The communication device of claim 4, wherein the different transmission power ranges comprises a first transmission power range between 0-2 dBm and a second transmission power range between 21-24 dBm, the first transmission power range correlated by the look-up information to the short-range wireless communication, and the second transmission power range correlated by the look-up information to the long-range wireless communication.

6. The communication device of claim 1, wherein the processing unit is to trigger the wireless communication module to establish the long-range wireless communication based on a distance between the communication device and the first device exceeding a threshold.

7. A method comprising:
storing, in a storage medium, look-up information that correlates transmission power ranges to respective different range wireless communications, the different range wireless communications comprising a short-range wireless communication and a long-range wireless communication;
detecting a first device by a wireless communication module in a communication device;
establishing the short-range wireless communication with the first device by the wireless communication module via a first radio frequency (RF) channel associated with a frequency band;
detecting a second device by the wireless communication module; and
determining, based on accessing the look-up information stored in the storage medium, a transmission power level for the long-range wireless communication; and
establishing, utilizing the determined transmission power level, the long-range wireless communication with the second device by the wireless communication module via a second RF channel associated with the frequency band to transmit and receive data between the second device and the communication device via the second RF channel, wherein the short-range wireless communication and long-range wireless communication are established simultaneously.

8. The method of claim 7, wherein the frequency band is a 60 GHz frequency band, wherein the short-range wireless communication is a wireless connection that uses the 60 GHz frequency band for pairing the first device to the communication device, and wherein the long-range wireless communication is a wireless gigabit alliance (WiGig) connection that uses the 60 GHz frequency band to transmit or receive the data between the second device and the communication device.

9. The method of claim 7, comprising:
determining, based on accessing the look-up information stored in the storage medium, a further transmission power level for the short-range wireless communication; and
utilizing the further transmission power level for establishing the short-range wireless communication via the first RF channel,
wherein the further transmission power level is less than the determined transmission power level.

10. The method of claim 9, wherein the further transmission power level is in a range of 0-2 dBm and the determined transmission power level is in a range of 21-24 dBm.

11. An apparatus comprising:
an antenna;
a processor; and
a non-transitory storage medium storing instructions executable on the processor to:
utilize a first transmission power level to enable pairing of a set of devices via a short-range wireless communication using a first radio frequency (RF) channel associated with a frequency band;
determine, based on accessing look-up information stored in the apparatus, a second transmission power level for a long-range wireless communication, the look-up information correlating transmission power ranges to respective different range wireless communications, the different range wireless communications comprising the short-range wireless communication and the long-range wireless communication; and utilize the second transmission power level to establish the long-range wireless communication with the set of devices via a set of second RF channels associated with the frequency band to transmit and receive data to and from the set of devices.

12. The apparatus of claim 11, wherein the instructions are executable on the processor to use a wireless connector technique associated with the frequency band for the short-range wireless communication and to use a wireless gigabit alliance (WiGig) technique associated with the frequency band for the long-range wireless communication, and wherein the frequency band is a 60 GHz frequency band.

13. The apparatus of claim 11, wherein the set of devices comprises an electronic device and a peripheral device, and wherein the apparatus is a docking station to communicate the data between the electronic device and the peripheral device via the set of second RF channels.

14. The apparatus of claim 11, wherein the apparatus is an electronic device, and wherein the data is communicated between the electronic device and the set of devices via the set of second RF channels.

15. The apparatus of claim 11, wherein the instructions are executable on the processor to connect the apparatus to each device of the set of devices via a respective second RF channel of the set of second RF channels.

16. The communication device of claim 1, wherein the processing unit is to pair the communication device with the first device using the established short-range wireless communication, and wherein the processing unit is to communicate data between the first device and a second device using the established long-range wireless communication.

17. The communication device of claim 16, wherein the established long-range wireless communication is a first long-range wireless communication, and wherein the processing unit is to establish a second long-range wireless communication with the first device via a third RF channel associated with the frequency band.

18. The communication device of claim 1, wherein the processing unit is to receive, from a user interface, an indication to switch from the short-range wireless communication to the long-range wireless communication.

19. The communication device of claim 1, wherein the processing unit is to establish the short-range wireless communication between the communication device and the first device responsive to the communication device and the first device between within 10 millimeters of one another.

20. The method of claim 7, further comprising:

receiving, from a user interface, an indication to switch from the short-range wireless communication to a long-range wireless communication for communication between the communication device and the first device.

* * * * *